Figure 1:
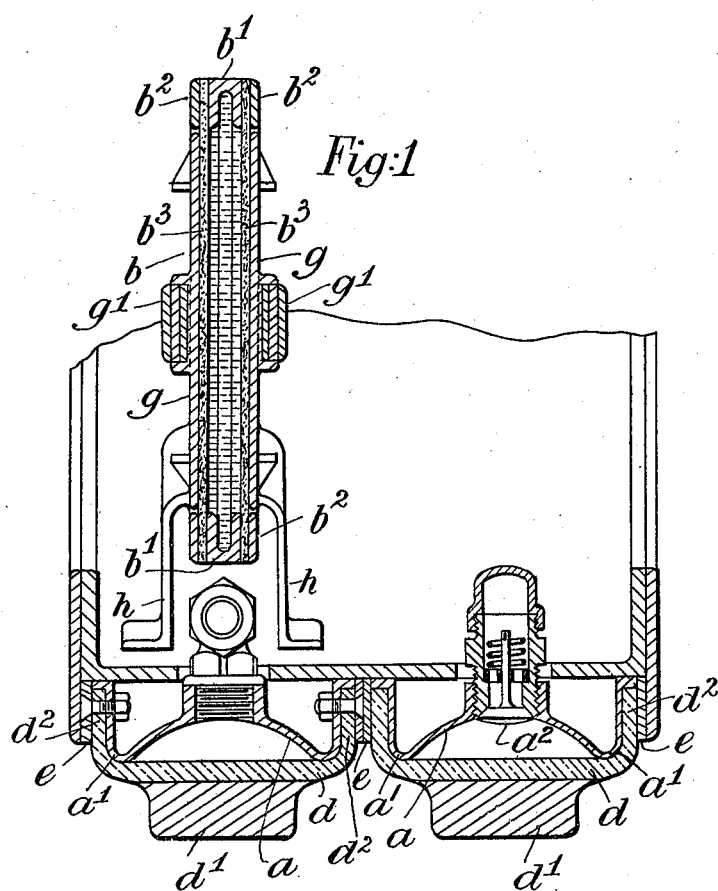

F. LAMPLOUGH.
RESILIENT TIRE.
APPLICATION FILED APR. 22, 1910.

975,539.

Patented Nov. 15, 1910.
3 SHEETS—SHEET 1.

WITNESSES
Ray J. Ernst.

INVENTOR
Frederick Lamplough
by his attorneys

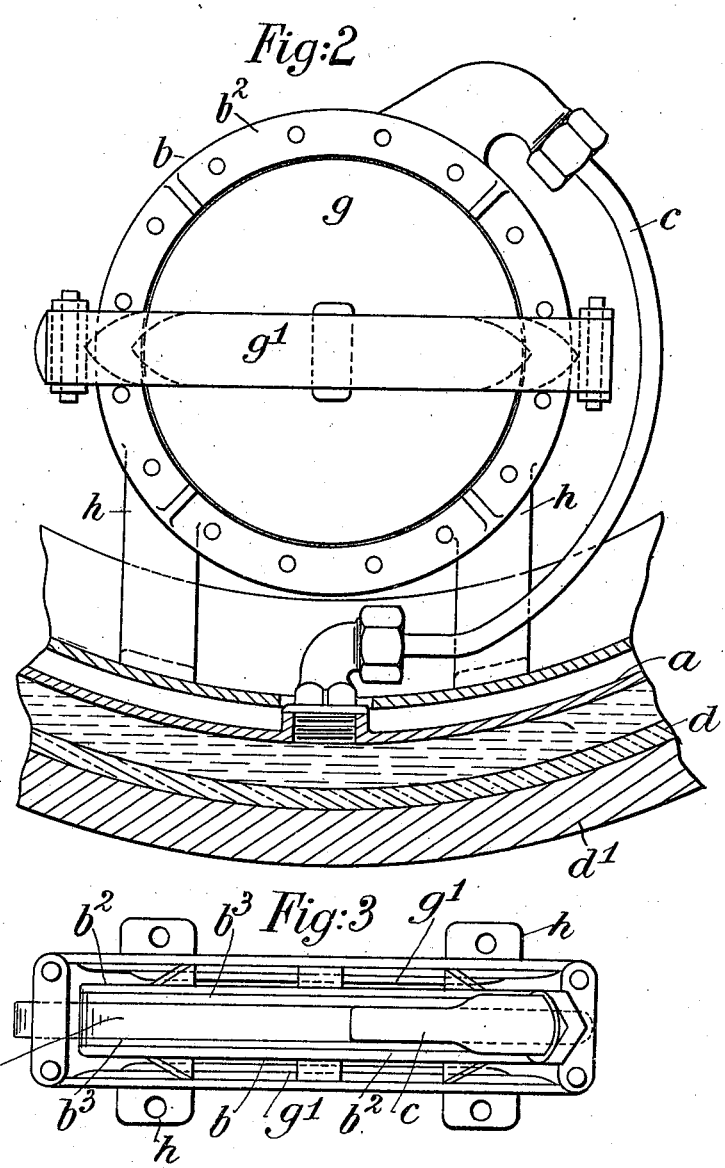

F. LAMPLOUGH.
RESILIENT TIRE.
APPLICATION FILED APR. 22, 1910.
975,539.
Patented Nov. 15, 1910.
3 SHEETS—SHEET 3.
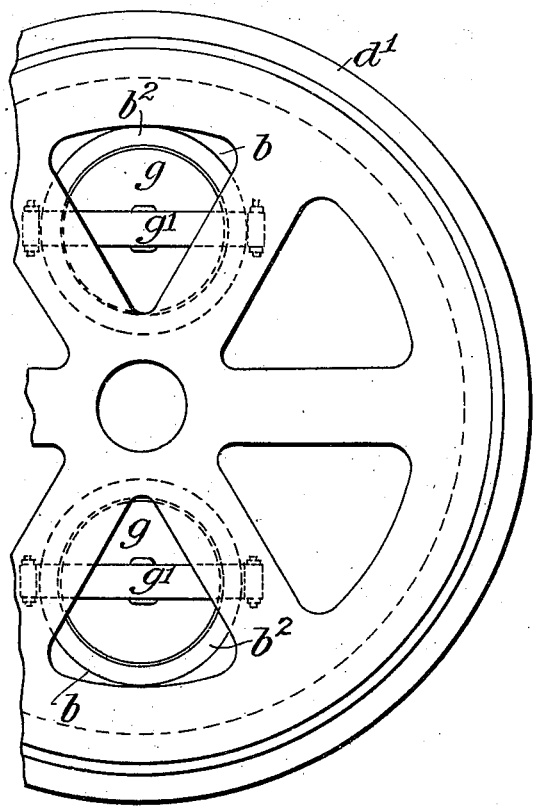
Fig:4
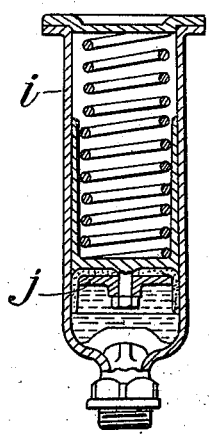
Fig:5
Witnesses
H. H. Knight
Ray J. Ernst.
Inventor
Frederick Lamplough
by his attorneys

UNITED STATES PATENT OFFICE.

FREDERICK LAMPLOUGH, OF LONDON, ENGLAND.

RESILIENT TIRE.

975,539.	Specification of Letters Patent.	Patented Nov. 15, 1910.

Application filed April 22, 1910. Serial No. 556,954.

*To all whom it may concern:*

Be it known that I, FREDERICK LAMPLOUGH, a subject of the King of Great Britain, residing at London, England, have invented a new and useful Resilient Tire, of which the following is a specification.

The invention relates to that type of wheel provided with a spring-pressed fluid-carrying chamber for the purpose of rendering the wheel or its tire resilient.

The object of the present invention is to construct an improved wheel of this type with a resilient or floating tire in contact with the road, in order to minimize the crushing strain to which a solid tire is subjected at the point of contact with the road.

I will describe my invention by the aid of the accompanying drawings, in which—

Figure 1 is a cross section, and Fig. 2 a sectional side view of parts of my improved wheel. Fig. 3 is a plan of one of the spring-pressed hollow disks or chambers used. Fig. 4 is a side elevation of the wheel with a part broken away and drawn to a smaller scale, and Fig. 5 is a longitudinal section of another form of spring-pressed chamber which may be used in lieu of a hollow disk.

According to my invention, as shown in Figs. 1, 2, 3 and 4, I construct a wheel with a hollow rim or channel $a$ communicating with one or more hollow chambers or disks $b$ by means of a pipe $c$ or in other suitable manner. The periphery of the rim $a$ forms a wide channel and its edges $a'$ are curved inward. I cover this channel with a flexible diaphragm $d$ of rubber, canvas and rubber, leather or other suitable material, and thus form a fluid chamber. The said diaphragm $d$ has flanges $d^2$ at the edges and a tight joint is made between said flanges and the sides of the wheel rim $a$ by means of plate metal rings $e$ firmly screwed or bolted to the sides of the rim, the flanges of the diaphragm being between such parts. Water or a suitable solution is pumped through a non-return valve $a^2$ into the rim $a$ and hollow chamber or chambers $b$ and the pressure caused by the weight of the vehicle is supported by the liquid bed formed around the rim and evenly distributed. Further resiliency is imparted to the diaphragm $d$ by means of spring-loaded diaphragms $b^3$ on the sides of the hollow chambers or disks $b$ which serve to compensate for the irregularities of the road surface. In the example shown in Figs. 1 to 4 the hollow chambers or disks $b$ are formed of a ring $b'$ and two rings or plates $b^2$, between each of which latter and the ring $b'$ a flexible diaphragm $b^3$ is fixed. These hollow chambers or disks $b$ are pressed upon by disks $g$ under the influence of springs $g'$ and they are fixed to the body of the wheel by brackets $h$.

To prevent wear on the elastic diaphragm $d$ I provide it with a running surface having a thick tread $d'$ or blocks of rubber, steel or other suitable material.

As a modification the hollow disk or chamber $b$ may be replaced by a bottle shaped chamber $i$ shown in Fig. 5 which communicates with the channel around the wheel rim and is provided with a spring-pressed piston $j$.

In the above specification I have only referred to a single tire, a single rim and a single hollow disk or chamber although in the drawings I have shown a wheel provided with two tires, two rims and two hollow chambers.

What I claim is:—

In a resilient tired wheel, the combination of a channel rim, a flexible diaphragm fixed to the edges of the channel rim and forming a fluid chamber, a running surface on said flexible diaphragm, a pipe connected at one end to the channel rim, a hollow disk connected to the other end of said pipe and comprising an outer central ring, a flexible diaphragm on each side of said ring and rings clamping said diaphragms to the central ring, disks acting upon the last mentioned diaphragms and springs acting against said disks, substantially as shown and described.

In witness whereof I have hereunto set my hand in presence of two witnesses.

FREDERICK LAMPLOUGH.

Witnesses:
 WM. GIRLING,
 R. WESTACOTT.